(12) United States Patent
Sutherland

(10) Patent No.: US 6,406,780 B1
(45) Date of Patent: Jun. 18, 2002

(54) PROCESS FOR COATING FOAM

(75) Inventor: Euan Sutherland, Shepparton (AU)

(73) Assignee: Commercial Bureau PTY LTD (AU)

( * ) Notice: Subject to any disclaimer, the term of this patent is extended or adjusted under 35 U.S.C. 154(b) by 0 days.

(21) Appl. No.: 09/308,572

(22) PCT Filed: Nov. 24, 1997

(86) PCT No.: PCT/AU97/00798

§ 371 (c)(1),
(2), (4) Date: Jul. 21, 1999

(87) PCT Pub. No.: WO98/23671

PCT Pub. Date: Jun. 4, 1998

(30) Foreign Application Priority Data

Nov. 22, 1996 (AU) .............................................. PO3794

(51) Int. Cl.[7] .................................................. B32B 3/00
(52) U.S. Cl. ................................. 428/306.6; 428/308.4; 427/421; 427/407.1; 427/412.1
(58) Field of Search ............................. 427/421, 407.1, 427/412.1; 428/306.6, 308.4

(56) References Cited

U.S. PATENT DOCUMENTS

| 4,046,587 A | * | 9/1977 | Guglielmo, Sr. ............. 106/271 |
| 4,368,222 A | * | 1/1983 | Blegen et al. ............... 427/340 |
| 4,681,808 A | | 7/1987 | Lefler, III ................ 428/425.5 |

FOREIGN PATENT DOCUMENTS

| GB | 1 588 941 | | 5/1981 | |
| GB | 1588941 | * | 5/1981 | ............ B05D/1/02 |

* cited by examiner

Primary Examiner—Blaine Copenheaver
Assistant Examiner—Leanna Roché
(74) Attorney, Agent, or Firm—Akerman Senterfitt

(57) ABSTRACT

This invention relates to a process for sealing any foamed rubber product or foamed plastic product having a foam cell structure, excluding foamed polystyrene, to provide a continuous, flexible, impervious surface including applying to the surface a primer which penetrates partially into the foam cell and then applying a polymeric composition to the primer-treated surface. The invention also relates to formulations used in the process and products produced by the process.

70 Claims, No Drawings

PROCESS FOR COATING FOAM

This application claims priority from PCT/AU97/00798 filed on Nov. 24, 1997 which claims priority from Australian Application No. PO 3794 filed on Nov. 22, 1996.

FIELD OF INVENTION

This invention primarily relates to foams, such as foamed plastics and foamed rubber. In particular, this invention relates to a process and formulations for sealing products, especially foam products. The invention also applies to other substrates (or products) having a degree of porosity.

BACKGROUND TO THE INVENTION

Foamed plastics are porous, very light substances made of various plastics such as epoxide resins, urea resins, polyurethane, polystyrene, polyethylene or polyvinylchloride. Phenolics, silicones and cellulose acetates can also be foamed. In fact, under the right conditions, almost any thermosetting or thermoplastic resin can be converted into a foam. Foamed plastics have a cellular structure and can be divided into foams having a closed cell structure and foams having an open cell structure.

Foams which have a closed cell structure are synthesised by incorporating a blowing agent or a propellant into the plastic which either evaporates or decomposes at the fusion point of the plastic, releasing gas bubbles which are trapped during the gelling of the plastic.

Foams which have an open cell structure are synthesised by incorporating an inert gas into the resin under pressure and then releasing the mixture to the atmosphere and curing the resulting foam.

Foams may either be flexible or rigid and have a wide variety of uses. Rigid or hard foams such as polyethylene are particularly used for thermal insulation, or furniture and building panels, whereas softer foams are used for cushioning materials, all types of padding and sponges.

Foamed rubber is a highly elastic, porous and lightweight rubber. It is made by various methods using natural or synthetic latex which is mixed with various ingredients and converted to foam. The foam rubber can also be molded and vulcanised. Foam rubber contains approximately 85% air and, similar to foamed plastics, can be used for a wide range of consumer goods including padding for furniture, mattresses and pillows.

Inherent in the majority of uses of foamed plastic or rubber (foam) is the fact that the foam is generally required to be covered or sealed in some way, for both functional, hygienic as well as aesthetic reasons.

The covering and sealing of foam mattresses, pillows, cushions and similar products inhibits the build-up of dust and dust mites in such products. This has significant health benefits.

The covering and sealing of such foam products is particularly important in the medical healthcare industry where foam is used for mattresses, pillows, cushions, commodes and operating theatre aids, with plastic or some other covering material, purchased and stitched or made up to cover the foam for the mattresses etc. There have been increasing instances of patients in hospitals and nursing homes catching infections from such foam mattresses, pillows and cushions, due to the fact that the infection had harboured in either the stitched seams of the covering, in cracks, in ridges or indentations in the surface or had actually lodged in the foam itself.

In order to reduce the sites on the covering or foam where the bacteria can be deposited, and to prevent such problems of infection, manufacturers have attempted to provide a plastic coating which will adhere to foam and thus completely seal it. One US manufacturer has attempted to coat foam by dipping the foam in a vat of coating. However, the method is not able to be used on open cell foams, and further, the coating has a tendency to delaminate from the foam.

Various lamination methods have also been tried to clinically seal foam products. For example, GB patent 1 588 941 discloses the sealing of a pad of foam material by a plurality of spray coatings of a flexible-non porous material such as polyvinylchloride (PVC), at least the final coating of which must contain electrically conductive carbon particles.

U.S. Pat. No. 4,046,587 ("Guglielmo") describes a primer composition for laminating a vinyl protective film onto a polyolefinic-containing foam. The process which is described in Guglielmo is directed to the application of the primer to the foam. This application is stated to be simple (and facile) and no special conditions or equipment are specified for the successful use of the primer. Guglielmo states that, following application of the primer, the vinyl coating may be painted on using a solution formulation of polyvinyl coating.

However, the above methods have either resulted in no bonding or inadequate bonding of the laminate to the foam, or a slight initial bonding which later delaminated when the total foam was sealed, resulting in the plastic laminate cover lifting from or falling off the foam.

OBJECTS OF THE INVENTION

Thus, one object of this invention is to provide a process for sealing foam products such that a substantially continuous, seam free, sealed surface can be obtained; and with the foam still maintaining its flexibility and its foam-like characteristics. Another object of this invention is to provide a flexible foam product with a substantially continuous, seam free, sealed surface.

STATEMENT OF INVENTION

Accordingly, a first aspect of the invention provides a process of sealing any foamed rubber product or foamed plastic product, excluding foamed polystyrene, to provide a substantially continuous, flexible, impervious surface, said process including:

(i) applying to a surface of said product a primer of foam-penetrating viscosity, such that the primer penetrates partially into the product, at least partially coating said surface, and (ii) applying a liquid first polymeric composition onto the primer-treated surface;
wherein the primer and the first polymeric composition are applied by spraying at a pressure of between about 30 psi and 80 psi.

Where used in this specification, the term "psi" is taken to mean "psi (gauge)" rather than "psi (absolute)".

Preferably, at least one additional layer of a liquid second polymeric composition is also applied to the treated surface.

Preferably, the primer and the first polymeric composition are applied at a pressure of between about 35 psi and 70 psi and, more preferably, at a pressure of about 60 psi. Accordingly, appropriate high pressure spraying equipment is generally required.

The primer and the first copolymer solution are preferably applied so that they penetrate to a depth of between 1 mm and 10 mm beyond the foam surface. The extent (or depth) of penetration will depend on the density of the foam. For instance, penetration in a high density foam will be less than in a low density foam. For very high density foams, the depth of penetration may be less than 1 mm and for very low density foams, it may be greater than 10 mm. This should not affect the effectiveness of the process.

The formulation of the primer may be the same as or, preferably, different from the formulation of the first and/or second polymeric composition.

Preferably, the first polymeric composition, in association with the primer, forms a sealed layer onto which the second polymeric composition may be applied.

Preferably, the primer, the first polymeric composition and the second polymeric composition include an adhesive polymeric resin. The adhesive polymeric resin may include monomer resins, co-polymer resins or both. More preferably, the primer, the first polymeric composition and the second polymeric composition include at least one of the following: chlorinated rubber, rubber based polymeric resins and their derivatives- including synthetics, elastomeric polyurethane, elastomeric acrylics and their derivatives including styrene acrylic, silicone and silicone derived resins and vinyl resins.

Still more preferably, the primer, the first polymeric composition and the second polymeric composition include a co-polymerised polyvinylchloride (PVC) composition.

Most preferably, the primer, the first polymeric composition and the second polymeric composition include a polyvinyl chloride/poly vinyl acetate copolymer.

The first polymeric composition and the second polymeric composition may preferably include the same adhesive polymeric resin as is included in the primer. In other respects, such as concentration of the adhesive polymeric resin and the inclusion of additives and excipients, the formulation of the primer may differ from the formulation(s) of the first and second polymeric compositions.

The formulation of the primer should be such that it is less viscous than the formulations of the first polymeric composition and the second polymeric composition. Also most preferably, the second polymeric composition includes the same adhesive polymeric resin as the first polymeric composition. The first polymeric composition may be the same as the second polymeric composition.

Preferably, the additional layers of the second polymeric composition are applied sequentially by a coat on coat process to result in a sealing coat.

Preferably, the sealing coat is built up to a thickness of at least 450 µm.

More preferably, the sealing coat will be between about 450–900 µm.

A second aspect of this invention provides a formulation, when used as a primer and/or as a polymeric composition in the process described herein, said formulation including an adhesive polymeric resin. The adhesive polymeric resin may include monomer resins, co-polymer resins or both.

More preferably, the formulation includes at least one of the following: chlorinated rubber, rubber based polymeric resins and their derivatives including synthetics, elastomeric polyurethane, elastomeric acrylics and their derivatives including styrene acrylic, silicone and silicone derived resins and vinyl resins.

Still more preferably, the formulation includes a co-polymerised polyvinylchloride (PVC) composition.

Most preferably, the formulation includes a polyvinyl chloride/poly vinyl acetate copolymer.

Preferably, the foamed rubber or plastic is foamed polyurethane or polyethylene—most preferably, polyurethane foam.

A further aspect of the invention provides a foamed product having a substantially continuous, flexible, impervious sealed surface which has been produced according to the above process.

A still further aspect of the invention provides a sealed foamed plastic or foamed rubber product—excluding foamed polystyrene products—having surfaces at least partially coated with a primer and at least one layer of a polymeric composition such that at least a majority of foam cells in the foamed product are sealed. Preferably, the surfaces of the product are substantially, or, preferably, completely coated with the primer and polymeric composition.

The crux of this invention lies in the fact that the process of sealing causes the polymeric coating to become integral or inherent with the foam structure itself. Thus, the sealing does not form a separate skin on top of the foam which can be lifted off the foam but, instead, the sealing occurs at least partially within the foam structure below the surface of the foam. This is understood to be due to the primer apparently forming a mechanical bond with the foam within the foam structure and the subsequent application(s) of polymeric composition(s) is understood to result in a chemical bond with the primer. The subsequent build up of the sealing membrane film seals the foam so that it becomes substantially impervious to liquids.

Thus, the final foam product has a sealing elastomeric membrane which is integral or inherent with the foam structure itself and cannot easily be separated from the foam.

Advantageously, the sealed foam still retains its flexibility and its other general foam characteristics, yet is substantially impervious to liquids and infectious agents such as bacteria. Further, the sealed foam can be cleaned with standard antibacterial and antifungal agents, without jeopardising the imperviousness of the sealed layer.

This invention is of such a breakthrough nature that the applications of the foam-sealing process are endless. Such areas of application will include, but will not be limited to:

a) the medical/healthcare industry for cushions, seats, mattresses, flotation products, furniture and equipment, b) the marine industry for cushions, matting and protective covers including buffers, c) the sports industry for matting, pole surrounds and cushioning in general, d) the domestic industry for matting, mattresses, flotation equipment, cushions and underlays.

e) the hospitality industry for cushions, flotation products, furniture and equipment, and f) the motor industry for cushions, underlays and overlays, thermal and acoustic insulation.

g) any fabric product capable of covering foam (such as cotton, canvas and synthetic fabrics; and h) industry generally where foams are used.

DETAILED DESCRIPTION OF THE INVENTION

Foamed Plastic/Rubber

Any foamed rubber product or foamed plastic product having any standard irregular foam cell structure—whether it be open cell or closed cell—can be sealed according to the process of this invention—except for polystyrene. Polystyrene is not receptive to any of the polymeric resins which can be used in the primer or in the coating compositions. The solvents in the polymeric compositions and primer in fact dissolve the polystyrene structure. While a styrene based acrylic resin could be used to seal polystyrene, the sealed foam product which results will not be flexible, but will instead be rigid. A rigid sealed foam product is generally not desirable.

Primer

The primer is required to have a viscosity which is 'thin' enough such that upon pressurised application of the primer onto the foam, it can immediately penetrate through the foam surface and permeate into the foam structure. This is sometimes termed 'water thin', as the primer is effectively as thin as water.

The primer is also preferred to be fast drying. 'Fast drying' effectively means that the primer should dry before it penetrates more than a few millimeters below the foam surface into the foam structure. The polymeric resins which are preferred as primers for this invention all dry within seconds of contacting and beginning to permeate through the foam structure. Of course, if the primer composition is somewhat more viscous and takes some time to penetrate past the foam surface into the foam structure, then it will not need to be so fast drying.

It is also preferred that the ingredients of the primer are chosen so that, following application and drying of the primer, the dried primer retains flexibility and resilience, so that physical characteristics of the foam are substantially maintained.

The primer can be any adhesive polymeric resin. The resin is of course incorporated with the usual acceptable excipients including solvents into the primer formulation which is applied to the foam surface. A person skilled in the art of polymeric resins would easily be able to determine an appropriate primer formulation for application in this invention.

Most effectively, the primer is applied onto and into the foam by spraying the primer, under pressure, onto the foam surface. The primer should be applied at a pressure of between about 30 psi and 80 psi. Typically, the application pressure is about 60 psi. The most preferred method of application is a pressurised spray gun.

The primer penetrates the foam structure and, at least in respect of open cell foams, surrounds the external surfaces of the foam cells present in the cellular structure. As the primer dries, it forms a layer on the outer surfaces of the foam cell walls it has contacted. Substantially all of the cells adjacent the surface of the foam have preferably been at least partially coated with the primer. Preferably the primer has penetrated and coated the foam structure to a depth of between 1 and 10 mm below the foam surface. More preferably, the penetration depth is about 4 or 5 mm. This preferred coating depth is for typical foams. The depth of the primer coating is not necessarily consistent from one foam to another as the depth will be dependant on the density of the foam. For example, for dense foams the coating depth may be no more than 1 or 2 mm, whereas for very low density foams, the coating depth may even exceed 10 mm. Further the primer layer may be of varying thickness around a cell or from one cell to another. However, the primer coating is such that the foam cells remain 'cells' insofar as the coating is not intended to break open and enter the cells. Typically, the primer penetrates the foam through intercellular spaces.

First Polymeric Composition

The first polymeric composition is a liquid which also needs to be applied to the foam by spraying it, under pressure, onto the surface of the foam. It is applied onto the surface of the foam at sufficient pressure so that at least some of it penetrates below the surface of the foam. It can then bind with the primer which has also penetrated into the foam. The depth of penetration of the first polymeric composition will generally be less than the depth of the primer. The pressure at which the first polymeric composition is applied is typically the same as for the primer—namely, between 30 psi and 80 psi. A particularly preferred application pressure is about 60 psi. The most preferred method of application is a pressurised spray gun.

The application of the first polymeric composition can occur any time after the application of the primer. In fact the primer can still be wet or it can be dry. As the primer generally dries very quickly, it will usually be dry when the first polymeric composition is applied. The first polymeric composition includes an adhesive resin which is most preferably identical to, or of the same family as, the resin which is applied in the primer. The first polymeric composition is preferably formulated so that it is significantly more viscous than the primer. The first polymeric composition is understood to form a chemical bond with the primer to form a seal which is effectively like a film or membrane. This application generally seals the majority of the foam surface. Of course the extent of the sealing is dependent on a number of factors, including the thickness of the resin used in the polymeric coating. It is possible that, if applied correctly, only one application of the first polymeric composition may be sufficient to create a sealing layer which is substantially impervious to liquids and is of at least 450 to 650 microns thick.

However, while the application of the first polymeric composition generally results in the majority of the foam surface being covered or webbed over such that a seal is formed, it is most preferable to apply further coats as described below, particularly if the application of the first polymeric composition onto the primed surface has not resulted in total sealing, to build up a sealing coat. The sealing coat is in the form of an elastomeric membrane due to the usage of an adhesive resin.

Second Polymeric Composition

While after the application of the first polymeric composition onto the foam surface, a seal has generally formed, it is possible that the seal is either somewhat fragile or, in an exceptional case, not complete. It is then preferable to sequentially apply one or more further coats of a second polymeric composition onto the surface of the sealed foam structure. This application can occur at any time after the application of the first polymeric composition. The subsequent applications need not be done under pressure and can be applied by use of a spray gun, painting, dipping or other appropriate methods. Although, preferably, it is applied under pressure.

Further, it is preferred that this second polymeric composition is the same as or includes the same polymeric resin as the first polymeric composition. In this way, a seal is built up which preferably consists of primer, first polymeric and second polymeric compositions which preferably all include an identical adhesive resin. 450 $\mu$m is the preferred minimum thickness of the membrane seal built up by the coat on coat application of the second polymeric composition. It is particularly preferred that coats of the second polymeric composition are applied until the thickness of the membrane is between 450 and 900 $\mu$m.

An adhesive resin is of course incorporated with the usual acceptable additives and excipients including solvents into the first and second polymeric compositions which are applied. A person skilled in the art of polymeric resins would easily be able to determine the appropriate polymeric compositions for application in this invention.

DESCRIPTION OF PREFERRED EMBODIMENT OF INVENTION

A preferred embodiment of the process according to the first aspect of this invention will now be described.

A piece of flexible polyurethane foam of any thickness and size is taken. Any moisture or surface contamination (such as dirt, dust or grease) should be removed. The foam should then be placed in such a way that application can be executed readily from any angle.

Primer containing polyvinylchloride/polyvinylacetate copolymer is then applied by pressurised spraying the surface of the foam. The spraying pressure is typically about 60 psi. It is recommended that, during application of the primer, a continuous pressure of about 60 psi is maintained on the air line at the spray gun and about 40 psi is maintained on the fluid line, to ensure adequate atomisation of the material. It is preferred that, when applying the primer, the spray gun is held about 20 to 25 cm directly above the surface being sprayed. At this (relatively low) height, significant penetration of the primer occurs. This copolymer immediately permeates into the structure of the foam and, being a fast-drying adhesive, generally penetrates no more than about 2–5 mm into the foam before it dries and adheres in the foam (forming a mechanical bond with the foam).

A pressure spray gun or any other high pressure external atomising equipment is filled, for convenience, with a polymeric composition containing the same copolymer. At any time after applying the primer, preferably at least 10 minutes later, the polymeric composition is applied under pressure onto the foam surface across its entire surface area. A good heavy layer of the polymeric composition should be applied to the primed area.

It is also recommended that, during application of the primer, a continuous pressure of about 60 psi is maintained on the air line at the spray gun and about 40 psi is maintained on the fluid line. This should ensure adequate atomisation for an even, smooth finish.

For best results, the first polymeric composition should be applied in a first set of parallel passes, such as up, down, up, down etc, with each pass overlapping the previous pass by about 50%, followed by a second set of parallel passes, perpendicular to the first set, such as left to right, right to left etc.

The method of applying by parallel passes, as described above, should also be adopted in all coatings of the second polymeric composition.

When the first and second polymeric compositions are being applied, it is preferred that the spray gun is held directly above and about 30–60 cm from the surface of the foam. The nozzle of the spray gun is typically adapted so that when the spray gun is held 30–60 cm from the surface of the foam, the cross-section of the spray hitting the surface defines a rectangle of about 2.5 cm×10 cm.

If it is necessary to provide "webbing" (for instance, to provide a cover over any significant holes or cavities in the foam) this can preferably be done prior to application of the first polymeric composition. Webbing may be achieved by holding the spray gun about 90 cm above the surface of the foam. The trigger should be squeezed slowly until feathers or threads of the composition appear. These feathers will bridge across openings to produce a web on which a proper wet coat can be applied. This operation should be done with care so that the normal film build can be applied into and on top of the completed "webbing" process.

The high build elastomeric membrane which is formed has the ability to bridge holes in the foam. Once the dry membrane coat is 450 microns thick, it is impervious to liquids and most gases. At 550 microns, the membrane is tensile with total elasticity. At 950 microns, the membrane is substantially impervious to everything but Freon gas.

Manufacture of Formulations

The formulations suitable for use in the process of the present invention, are generally manufactured in a heat jacketed, medium speed closed mixing vessel. A multi-step process is usually performed in the manufacture of the formulations which can generally be described as follows:

Step one—Pump in solvents according to formulation.

Step two—Slowly add in resins while the mixer is on.

Step three—Start heating the vessel to a maximum of 60° C. over three hours.

Step four—Add plasticisers and stabilisers during the heating process.

Step five—Once the mix is up to specified temperature, allow it to continue stirring for one hour before adding any other component. This allows the components to fuse or bind together, and is called copolymerisation.

Step six—SLOWLY add pigments and fillers which have been prepared as a premix.

Step seven—Add all other additives and allow to continue stirring for one hour.

The formulation should not be canned until it has cooled to ambient temperature.

Examples

Suitable examples of formulations suitable for use in the subject invention are given below. The numerals given in the third columns (below) correspond with the relevant process step at which the relevant components are added to the formulation during manufacture (as described above under the heading 'Manufacture of Formulations').

Example 1

A formulation which is particularly suitable for use as a primer is set out below.

| COMPONENTS | (Kgs/100 L) | PROCESS STEP |
| --- | --- | --- |
| Toluol | 17.000 | 1 |
| Xylol | 17.000 | 1 |
| Methylisobutylketone | 20.800 | 1 |
| Acetone | 4.700 | 1 |
| Methylethylketone | 16.000 | 1 |
| Union Carbide VMCH | 7.500 | 2 |
| Union Carbide VAGH | 7.500 | 2 |
| Propylene Oxide | 0.449 | 6 |

Example 2

Another formulation for use as a primer in the process of this invention is given below.

| COMPONENTS | (Kgs/100 L) | PROCESS STEP |
|---|---|---|
| Toluol | 17.00 | 1 |
| Xylol | 17.00 | 1 |
| Methylisobutylketone | 21.00 | 1 |
| Acetone | 4.70 | 1 |
| Methylethylketone | 16.00 | 1 |
| Union Carbide VMCH | 7.50 | 2 |
| Union Carbide VAGH | 7.50 | 2 |
| Tri iso trimelitate | 2.00 | 6 |
| Propylene Oxide | 0.45 | 6 |

Example 3

An example of a preferred polymeric composition for both the first and second polymeric compositions is given below.

| COMPONENTS | (Kgs/100 L) | PROCESS STEP |
|---|---|---|
| Acetone | 26.360 | 1 |
| Methylethylketone | 26.360 | 1 |
| Toluol | 12.070 | 1 |
| Methylisobutylketone | 0.625 | 1 |
| Union Carbide VYNS (90:10) | 12.070 | 2 |
| Union Carbide VYHH (86:14) | 4.010 | 2 |
| Union Carbide VMCH (86:13:1) | 0.990 | 2 |
| Cereclor AS52 Chlorinated Paraffin | 2.250 | 4 |
| Diisooctylphthalate | 3.000 | 4 |
| Trioctyltrimellitate | 4.560 | 4 |
| Dioctyladipate | 1.430 | 4 |
| Wetting agent | 0.053 | 6 |
| Titanium dioxide | 0.850 | 6 |
| Flamtard fire retardant | 0.850 | 6 |
| Calcium carbonate | 0.850 | 6 |
| Dibasic lead phosphate 5:2 | 0.562 | 6 |
| Aluminium paste | 1.020 | 6 |
| Bentonite | 0.925 | 6 |
| 20% Black pigment paste | 0.001 | 6 |

Example 4

Another suitable formulation for use as a polymeric composition in the process is as follows.

| COMPONENTS | (Kgs/100 L) | PROCESS STEP |
|---|---|---|
| Toluol | 16.75 | 1 |
| Xylol | 16.75 | 1 |
| Methylisobutylketone | 32.50 | 1 |
| Union Carbide VYHH | 14.50 | 2 |
| Tri isotrimelitate | 3.20 | 4 |
| Dibasic lead phosphite | 2.30 | 4 |
| Tinuvin 1130 | .70 | 4 |
| Bisphenol A | .32 | 4 |
| Tiona 575 | 3.90 | 6 |
| Alcolec S | .32 | 6 |
| Corflex 880 | 1.30 | 6 |
| Methylisobutylketone | 3.20 | 6 |

A particularly preferred primer is 'POLYERGIC Primer 200™', which is a water clear, low viscosity, fast-drying primer.

A particularly preferred polymeric composition is 'POLYERGIC™' membrane covering.

It will be appreciated that, although the process of this invention has been described in relation to foams, the process can be used successfully in coating other substrates having a degree of porosity, including fiberglass, textiles and timber.

The claims defining the invention are as follow:

1. A process of sealing a foamed rubber product or foamed plastic product, excluding foamed polystyrene products, to provide a substantially continuous, flexible, impervious surface, said process including:
    (i) spraying a primer having foam-penetrating viscosity onto a surface of said product, at a pressure of between about 30 psi and 80 psi, such that, immediately upon contact of the primer with said product, the primer penetrates partially into the product at least partially coating said surface, and
    (ii) spraying a liquid first polymeric composition at a pressure of between about 30 psi and 80 psi onto the primer-treated surface, which effects at least partial penetration of said first polymeric composition into the product.

2. A process according to claim 1, including the additional step of applying at least one additional layer of a second polymeric composition to the surface which has been treated with said primer and said first polymeric composition.

3. A process according to any one of claim 2 wherein the second polymeric composition is applied to a surface of the product by spraying, painting or dipping.

4. A process according to any one of claim 2 wherein the first and second polymeric compositions are applied until substantially all of the product is sealed.

5. A process according to claim 2, wherein formulations of the first polymeric composition and the second polymeric composition are the same or different.

6. A process according to claim 5 wherein the formulation of the first polymeric composition and the second polymeric composition are the same.

7. A process according to claim 2, wherein the second polymeric composition includes a formulation containing an adhesive polymeric resin.

8. A process according to claim 7, wherein the primer, the first polymeric composition and the second polymeric composition include the same adhesive polymeric resin.

9. A process according to claim 7, wherein the adhesive polymeric resin is a monomeric resin or a co-polymeric resin.

10. A process according to claim 9, wherein the adhesive polymeric resin includes one or more of the following: chlorinated rubber, rubber based polymeric resins and their derivatives and synthetics, elastomeric polyurethane, elastomeric acrylics and their derivatives including styrene acrylic, silicone and silicone-derived resins and vinyl resins.

11. A process according to claim 10 wherein the adhesive polymeric resin includes a co-polymerised polyvinylchloride (PVC) composition.

12. A process according to claim 2, wherein the viscosity of the primer is less than the viscosity of the second polymeric composition.

13. A process according to claim 1 wherein the first polymeric composition, in association with the primer, forms a sealed layer on the surface of the product.

14. A process according to any one of claim 1 wherein the primer is applied such that it penetrates the product to a depth of at least 1 mm below the surface of the product.

15. A process according to claim 14 wherein the primer is applied to the product such that it penetrates the product to a depth of between 2 and 10 mm below the surface of the product.

16. A process according to claim 14, wherein the primer dries after penetrating from about 1 mm to about 10 mm below the surface.

17. A process according to any one of claims 1 where the primer and the first polymeric composition are applied by a pressurised spray gun or any other high pressure external atomising equipment.

18. A process according to claim 1, wherein the primer and the first polymeric composition include a formulation containing an adhesive polymeric resin.

19. A process according to claim 18, wherein the primer and first adhesive polymeric composition include the same adhesive polymeric resin.

20. A process according to claim 1, wherein the viscosity of the primer is less than the viscosity of the first polymeric composition.

21. A foamed rubber product, foamed plastic product or other porous product sealed according to the process defined in claim 1.

22. A process of sealing a foamed rubber product or foamed plastic product, excluding foamed polystyrene products, to provide a substantially continuous, flexible, impervious surface, said process including:
(i) applying a primer having foam-penetrating viscosity to at least a portion of a surface of said product, such that, immediately upon contact of the primer with the product, the primer penetrates partially into the product at least partially coating said surface, and
(ii) forcefully spraying under pressure a liquid first polymeric composition onto the primer-treated surface under pressure sufficient to effect at least partial penetration of said first polymeric composition into the product.

23. A process according to claim 22, including the additional, step of applying at least one additional layer of a second polymeric composition to the surface which has been treated with said primer and said first polymeric composition.

24. A process according to claim 23, wherein the first polymeric composition, in association with the primer, forms a sealed layer on the surface of the product.

25. A process according to claim 22, wherein the second polymeric composition is applied to a surface of the product by spraying, painting or dipping.

26. A process according to claim 23, wherein the first and second polymeric compositions are applied until substantially all of the product is sealed.

27. A process according to claim 23, wherein the second polymeric composition includes a formulation containing an adhesive polymeric resin.

28. A process according to claim 27, wherein the primer, the first polymeric composition and the second polymeric composition include the same adhesive polymeric resin.

29. A process according to claim 27, wherein the adhesive polymeric resin is a monomeric resin or a co-polymeric resin.

30. A process according to claim 29, wherein the adhesive polymeric resin includes one or more of the following: chlorinated rubber, rubber based polymeric resins and their derivatives and synthetics, elastomeric polyurethane, elastomeric acrylics and their derivatives including styrene acrylic, silicone and silicone-derived resins and vinyl resins.

31. A process according to claim 30, wherein the adhesive polymeric resin includes a co-polymerised polyvinylchloride (PVC) composition.

32. A process according to claim 23, wherein the viscosity of the primer is less than the viscosity of the second polymeric composition.

33. A process according to claim 23, wherein formulations of the first polymeric composition and the second polymeric composition are the same or different.

34. A process according to claim 33, wherein the formulation of the first polymeric composition and the second polymeric composition is the same.

35. A process according to claim 22, wherein the primer is applied such that it penetrates the product to a depth of at least 1 mm below the surface of the product.

36. A process according to claim 35, wherein the primer is applied to the product such that it penetrates the product to a depth of between 2 and 10 mm below the surface of the product.

37. A process according to claim 35, wherein the primer dries after penetrating from about 1 mm to about 10 mm below the surface.

38. A process according to claim 22, wherein the primer and the first polymeric composition are applied by a pressurized spray gun or any other high pressure external atomizing equipment.

39. A process according to claim 22, wherein the primer and the first polymeric composition include a formulation containing an adhesive polymeric resin.

40. A process according to claim 37, wherein the primer and the first polymeric composition include the same adhesive polymeric resin.

41. A process according to claim 22, wherein the viscosity of the primer is less than the viscosity of the first polymeric composition.

42. A foamed rubber product, foamed plastic product or other porous product sealed according to the process defined in claim 22.

43. A process of sealing a foamed rubber product or foamed plastic product, excluding foamed polystyrene products, to provide a substantially continuous, flexible, impervious surface, said process including:
(i) applying to a surface of said product a primer of foam-penetrating viscosity, such that the primer penetrates partially into the product at least partially coating said surface, and
(ii) forcefully spraying under pressure a liquid first polymeric composition onto the primer-treated surface, which effects at least partial penetration of said first polymeric composition into the product, wherein said primer and said first polymeric composition comprise a formulation including polyvinylchloride/polyvinylacetate copolymer.

44. A process according to claim 43, including the additional step of applying at least one additional layer of a second polymeric composition to the surface which has been treated with said primer and said first polymeric composition.

45. A process according to claim 44, wherein the first polymeric composition, in association with the primer, forms a sealed layer on the surface of the product.

46. A process according to claim 44, wherein the second polymeric composition is applied to a surface of the product by spraying, painting or dipping.

47. A process according to claim 44, wherein the first and second polymeric compositions are applied until substantially all of the product is sealed.

48. A process according to claim 44, wherein the viscosity of the primer is less than the viscosity of the second polymeric composition.

49. A process according to claim 44, wherein formulations of the first polymeric composition and the second polymeric composition are the same or different.

50. A process according to claim 49, wherein the formulation of the first polymeric composition and the second polymeric composition is the same.

51. A process according to claim 43, wherein the primer is applied such that it penetrates the product to a depth of at least 1 mm below the surface of the product.

52. A process according to claim 51, wherein the primer is applied to the product such that it penetrates the product to a depth of between 2 and 10 mm below the surface of the product.

53. A process according to claim 51, wherein the primer dries after penetrating from about 1 mm to about 10 mm below the surface.

54. A process according to claim 43, wherein the primer and the first polymeric composition are applied by a pressurized spray gun or any other high pressure external atomizing equipment.

55. A process according to claim 43, wherein the viscosity of the primer is less than the viscosity of the first polymeric composition.

56. A foamed rubber product, foamed plastic product or other porous product sealed according to the process defined in claim 43.

57. A process of sealing a foamed rubber product or foamed plastic product, excluding foamed polystyrene products, to provide a substantially continuous, flexible, impervious surface, said process including:
  (i) applying to a surface of said product a primer of foam-penetrating viscosity, such that the primer penetrates partially into the product at least partially coating said surface, and
  (ii) applying a liquid first polymeric composition onto the primer-treated surface, which effects at least partial penetration of said first polymeric composition into the product,
  wherein said primer and said first polymeric composition are applied by spraying at a pressure of between about 30 psi and about 80 psi, and
  wherein said primer and said first polymeric composition comprise a formulation including polyvinylchloride/polyvinylacetate copolymer.

58. A process according to claim 57 including the additional step of applying at least one additional layer of a second polymeric composition to the surface which has been treated with said primer and said first polymeric composition.

59. A process according to claim 58, wherein the first polymeric composition, in association with the primer, forms a sealed layer on the surface of the product.

60. A process according to claim 58, wherein the second polymeric composition is applied to a surface of the product by spraying, painting or dipping.

61. A process according to claim 58, wherein the first and second polymeric compositions are applied until substantially all of the product is sealed.

62. A process according to claim 58, wherein the viscosity of the primer is less than the viscosity of the first polymeric composition.

63. A process according to claim 58, wherein formulations of the first polymeric composition and the second polymeric composition are the same or different.

64. A process according to claim 63, wherein the formulation of the first polymeric composition and the second polymeric composition is the same.

65. A process according to claim 57, wherein the primer is applied such that it penetrates the product to a depth of at least 1 mm below the surface of the product.

66. A process according to claim 61, wherein the primer is applied to the product such that it penetrates the product to a depth of between 2 and 10 mm below the surface of the product.

67. A process according to claim 65, wherein the primer dries after penetrating from about 1 mm to about 10 mm below the surface.

68. A process according to claim 57, wherein the primer and the first polymeric composition are applied by a pressurized spray gun or any other high pressure external atomizing equipment.

69. A process according to claim 57, wherein the viscosity of the primer is less than the viscosity of the first polymeric composition.

70. A foamed rubber product, foamed plastic product or other porous product sealed according to the process defined in claim 57.

* * * * *

UNITED STATES PATENT AND TRADEMARK OFFICE
CERTIFICATE OF CORRECTION

PATENT NO. : 6,406,780 B1
DATED : June 18, 2002
INVENTOR(S) : Sutherland

It is certified that error appears in the above-identified patent and that said Letters Patent is hereby corrected as shown below:

Column 10,
Line 24, delete "any one of".
Line 27, delete "any one of".
Line 60, delete "any one of".

Column 11,
Line 1, delete "any one of".
Line 32, delete "," after the word "additional".
Line 39, delete "22" and replace with -- 23 --.

Column 12,
Line 21, delete "37" and replace with -- 39 --.

Column 13,
Line 39, insert -- , -- after "57".

Column 14,
Line 22, delete "61" and replace with -- 65 --.

Signed and Sealed this

Sixth Day of April, 2004

JON W. DUDAS
*Acting Director of the United States Patent and Trademark Office*